(No Model.)

P. MIHAN.
GAS BURNER AND PIPE PLIERS.

No. 272,573. Patented Feb. 20, 1883.

Witnesses.
S. N. Piper
E. B. Pratt

Inventor.
Patrick Mihan
by R. H. Eddy atty.

UNITED STATES PATENT OFFICE.

PATRICK MIHAN, OF CHELSEA, ASSIGNOR, BY MESNE ASSIGNMENTS, TO HIMSELF AND JOHN E. MORELAND, OF QUINCY POINT, MASS.

GAS BURNER AND PIPE PLIERS.

SPECIFICATION forming part of Letters Patent No. 272,573, dated February 20, 1883.

Application filed January 2, 1883. (No model.)

*To all whom it may concern:*

Be it known that I, PATRICK MIHAN, of Chelsea, in the county of Suffolk, of the Commonwealth of Massachusetts, have invented a new and useful Improvement in Gas Burner or Pipe Pliers; and I do hereby declare the same to be described in the following specification, and represented in the accompanying drawings, of which—

Figure 1:
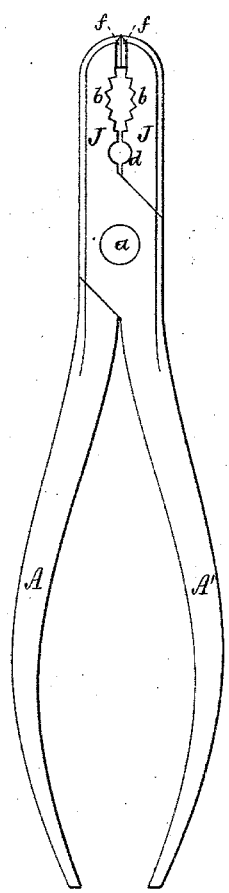
Figure 4:
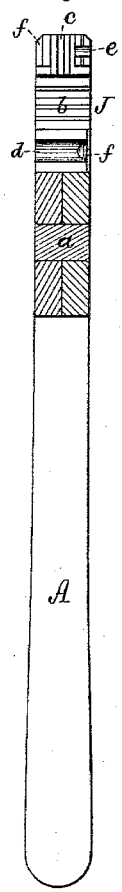
Figure 2:
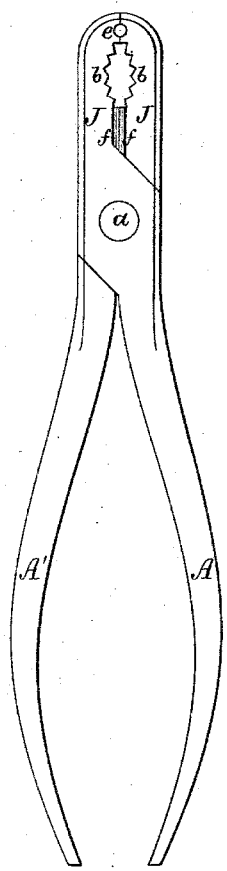
Figure 3:
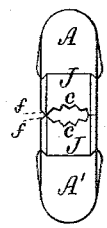

Figure 1 is a front view, Fig. 2 a rear view, Fig. 3 an end view, and Fig. 4 a longitudinal and median section, of pliers provided with my invention, the nature of which is defined in the claim hereinafter presented.

The pliers are composed of two levers, A A', fulcrumed together or having a common fulcrum, a, each of the jaws J being, as usual, provided with a curved and toothed recess, b, made through it transversely, such being the well-known mode of constructing such pliers. Besides such recesses in the jaws, I provide them with auxiliary curved and toothed recesses arranged in them lengthwise of them, each of such auxiliary curved and toothed recesses being shown at c c, and extending from the end of the main recess of its jaw to and through the extreme end of the jaw. These auxiliary recesses will be found to be very convenient, especially with the main recesses, for enabling the implement to be used in grasping and revolving screws or other devices which cannot conveniently be seized by it in its main toothed recesses. Furthermore, I make at the junction of the two jaws one or more round holes to lead from one side of the implement transversely into it, and to terminate close to its opposite side, the said holes being shown at d and e. I prefer to have in the jaws two of such holes, in which case the smaller or upper one, e, opens into the auxiliary toothed recesses, and at the opposite side of the implement such recesses have or terminate in cutting or sharp edges f f, which serve to enable the pliers to be used for severing a piece of wire when it is inserted through the hole e and between the two cutting-edges f, so the jaw parts at the bottom of the hole d may be used to sever a piece of wire when extended between them. Each hole may be either cylindrical or tapering, as may be desirable.

I claim—

The gas pipe or burner pliers having its jaws provided with toothed recesses extending through them laterally, as described, and with cutters for severing wire arranged in advance of such recesses.

PATRICK MIHAN.

Witnesses:
R. H. EDDY,
E. B. PRATT.